(12) United States Patent
Knorr et al.

(10) Patent No.: US 12,679,415 B2
(45) Date of Patent: Jul. 14, 2026

(54) HUMAN INTENT PREDICTION FOR DRIVER ASSISTANCE SYSTEM

(71) Applicant: cogniBIT GmbH, Munich (DE)

(72) Inventors: Alexander Georg Knorr, Munich (DE); Lukas Adam Brostek, Unterhaching (DE); Johannes Drever, Munich (DE); Christian Andreas Rössert, Kriens-Luzern (CH)

(73) Assignee: cogniBIT GmbH, Munich (DE)

( * ) Notice: Subject to any disclaimer, the term of this patent is extended or adjusted under 35 U.S.C. 154(b) by 21 days.

(21) Appl. No.: 18/816,251

(22) Filed: Aug. 27, 2024

(65) Prior Publication Data

US 2026/0062031 A1 Mar. 5, 2026

(51) Int. Cl.
| | |
|---|---|
| *B60W 60/00* | (2020.01) |
| *B60W 50/00* | (2006.01) |
| *G06V 10/70* | (2022.01) |
| *G06V 20/58* | (2022.01) |

(52) U.S. Cl.
CPC .... *B60W 60/0015* (2020.02); *B60W 50/0097* (2013.01); *B60W 60/00274* (2020.02); *G06V 10/70* (2022.01); *G06V 20/58* (2022.01); *B60W 2420/403* (2013.01); *B60W 2554/4045* (2020.02)

(58) Field of Classification Search
CPC ....... B60W 60/0015; B60W 60/00274; B60W 50/0097; B60W 2554/4045; B60W 2420/403; G06V 20/58; G06V 10/70; B60T 8/1755; B60L 7/18; B62D 1/00; G01W 1/02; G08G 1/167; G01S 13/931
USPC .......................................................... 701/23
See application file for complete search history.

(56) References Cited

U.S. PATENT DOCUMENTS

| | | | | |
|---|---|---|---|---|
| 8,788,134 | B1 * | 7/2014 | Litkouhi | ........... B62D 15/0255 |
| | | | | 701/23 |
| 11,853,065 | B2 * | 12/2023 | Max | .................... G08G 1/0129 |
| 12,494,122 | B2 * | 12/2025 | Plechinger | ........... G08G 1/0965 |
| 2019/0057320 | A1 * | 2/2019 | Docherty | ............. G06F 18/217 |
| 2019/0329763 | A1 * | 10/2019 | Sierra Gonzalez | ......................... |
| | | | | B60W 30/0956 |
| 2022/0126878 | A1 * | 4/2022 | Moustafa | ......... G08G 1/096758 |
| 2023/0286547 | A1 * | 9/2023 | Kim | ................ B60W 60/00276 |
| 2025/0284858 | A1 * | 9/2025 | Mendoza | ........... G06F 11/3684 |
| 2025/0289474 | A1 * | 9/2025 | Chen | ................ B60W 60/0027 |

FOREIGN PATENT DOCUMENTS

| | | | | | |
|---|---|---|---|---|---|
| EP | | 2950294 A1 * | 12/2015 | ............. | G06V 20/58 |
| WO | WO-2013108406 A1 * | | 7/2013 | ............... | G06N 7/01 |
| WO | | 2023/275401 A1 | 1/2023 | | |

* cited by examiner

*Primary Examiner* — Tuan C To
(74) *Attorney, Agent, or Firm* — Sage Patent Group

(57) ABSTRACT

This disclosure is directed to interfacing with a driver assistance system of the vehicle based on predictions of trajectories of one or more road users in a surrounding of the vehicle and includes determining the predictions based on instances of the behavioral model associated with each of the one or more road users.

20 Claims, 4 Drawing Sheets

OBTAIN SENSOR DATA — 3005

DETECT AND/OR TRACK ROAD USER(S) — 3010

PRIORITIZE ROAD USERS — 3011

SELECT NEXT ROAD USER — 3015

3091

3092

NEW ROAD USER(S)? — 3025

YES     NO

DETERMINE NEW PARAMETERIZATION FOR MODEL INSTANCE — 3030

UPDATE PARAMEERIZATION FOR MODEL INSTANCE — 3035

FURTHER ROAD USER? — 3040

YES     NO

INFER MODEL INSTANCES — 3045

INTERFACE WITH DRIVER ASSISTANCE SYSTEM — 3050

EXECUTE DRIVER ASSISTANCE SYSTEM — 3055

HUMAN INTENT PREDICTION FOR DRIVER ASSISTANCE SYSTEM

TECHNICAL FIELD

Various examples of the disclosure generally relate to a driver assistance system of a vehicle. Various examples of the disclosure specifically relate to a human intent prediction for one or more road users in a surrounding of the vehicle.

BACKGROUND

In recent years, driver assistance systems were introduced to support and/or assist the driver of vehicles in various manners. Examples of driver assistance systems include, but are not limited to: adaptive cruise control; autonomous emergency braking; advanced driver assistance systems (ADAS) such as automated or autonomous driving; etc. As a general trend, the higher the degree of transfer of driving tasks from the human to the driver assistance system, the higher the risk of safety-critical situations resulting from the operation of the driver assistance system.

It has been observed that some driver assistance systems take wrong or a sub-optimal decisions. Sometimes, this can result in a safety hazard for the driver and/or other road users in the surrounding of the vehicle.

SUMMARY

Accordingly, there is a need for advanced driver assistance systems. In particular, there is a need for driver assistance systems that mitigate or reduce the above-identified drawbacks.

This need is met by the features of the independent claims. The features of the dependent claims define embodiments.

Hereinafter, techniques are disclosed for enabling more accurate and reliable driver assistance systems. Driver assistance systems are interfaced with, e.g., provided with input data, based on predicted trajectories of one or more road users in a surrounding of the respective vehicle. Such trajectories may be predicted—i.e., estimated for the future—taking into account subjective decision-making of the respective one or more road users (human intent prediction). This is based on a behavioral model. The behavioral model can be inferred at the edge, i.e., using compute resources at the vehicle; this reduces latency making accurate predictions available even for time-critical situations. The driver assistance system can then control the vehicle—e.g., trigger an emergency braking and/or an evasive maneuver and/or trigger a warning—taking into account the predictions of the trajectories of the one or more road users. The resulting actions taken by the driver assistance system are reducing a risk of safety-relevant situations if compared to reference implementations which operate without such input that is based on a behavioral model.

A processing device for a vehicle is disclosed. The processing device includes at least one processor. The processing device further includes a memory. The at least one processor is configured to load program code from the memory and to execute the program code. The at least one processor, upon executing the program code, is configured to obtain sensor data from at least one sensor of the vehicle. The sensor data is indicative of one or more road users in a surrounding of the vehicle. The at least one processor, upon executing the program code, is further configured to determine a respective parameterization for respective instance of the behavioral model based on the sensor data and for each of the one or more road users. The at least one processor, upon executing the program code, is further configured to infer the respective instance of the behavioral model for each of the one or more users, to thereby determine a prediction of a respective trajectory of the respective road user. The at least one processor, upon executing the program code, is further configured to interface with the driver assistance system of the vehicle based on the predictions of the trajectories of the one or more road users.

A vehicle including such processing device is disclosed.

A method includes obtaining, from at least one sensor of a vehicle, sensor data indicative of one or more road users in a surrounding of the vehicle. The method also includes, based on the sensor data and for each of one or more road users, determining a respective parameterization for a respective instance of a behavioral model. The method further includes, for each of the one or more road users: inferring the respective instance of the behavioral model to determine a prediction of a respective trajectory of the respective road user. The method further includes, based on the predictions of the trajectories of the one or more road users, interfacing with a driver assistance system of the vehicle.

For instance, the method may further include, based on said interfacing with the driver assistance system, executing a safety function of the driver assistance system such as controlling the vehicle, executing an evasive maneuver, or triggering a warning.

It is to be understood that the features mentioned above and those yet to be explained below may be used not only in the respective combinations indicated, but also in other combinations or in isolation without departing from the scope of the disclosure.

DETAILED DESCRIPTION

Figure 1:
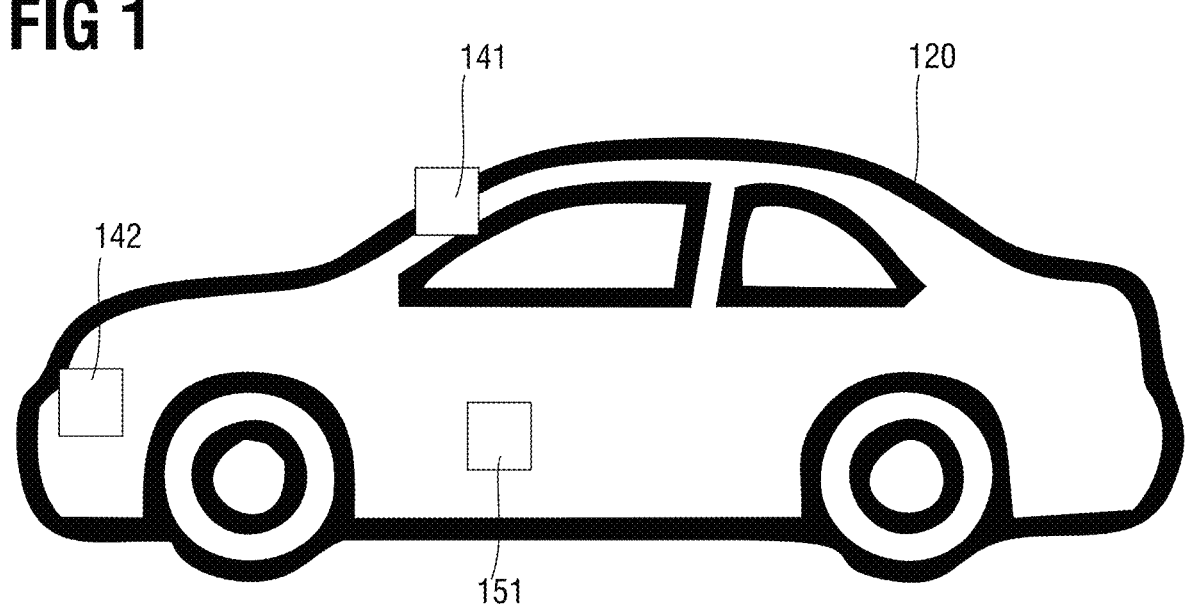
FIG. 1 is a schematic illustration of a vehicle according to various examples.

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, embodiments of the disclosure will be described in detail with reference to the accompanying drawings. It is to be understood that the following description of embodiments is not to be taken in a limiting sense. The scope of the disclosure is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques are disclosed that pertain to driver assistance systems. Examples include advanced driver assistance systems include assisted, automated, or even autonomous driver assistance systems, e.g., Level 2 to Level 5 automated driving. Further examples include driver assistance systems triggering emergency braking and/or evasive maneuvers. The techniques disclosed herein generally enable the driver assistance system to plan a trajectory of the vehicle, i.e., to set the vehicle speed as a function of time, thereby defining the route of the vehicle through its surrounding within a prediction timeframe. In some scenarios, the driver assistance system may provide an output to the user, e.g., a graphical output, to enable the user to implement the plan trajectory. For instance, the driver assistance system may output a warning if emergency braking is required. For instance, the driver assistance system may amplify a braking input signal in an emergency braking situation.

As a general rule, the techniques disclosed herein can support driver assistance systems operating on different prediction time frames. For instance, a short-term prediction timeframe may be associated with a planning the route of the vehicle for the next second or next few seconds. Examples include emergency braking and/or evasive maneuvers responsive to an immediate threat. Mid-term and long-term prediction timeframes are typically associated with planning horizons of more than a few seconds up to a few 10 seconds or even longer. Typical examples include assisted, automated, or autonomous driving, e.g., on a highway or freeway without immediate threat situations (sometimes referred to as "cruising").

Hereinafter, techniques are disclosed that enable interfacing or even operating a driver assistance system based on predictions of trajectories of one or more road users. Road users can be motorized road users, i.e., road users in vehicles such as passenger cars, trucks, etc. Other examples of road users include pedestrians or cyclists.

For instance, trajectories of the one or more road users may be predicted within a prediction timeframe. The prediction timeframe of the trajectories of the one or more road users in the surrounding may coincide or correspond with the prediction timeframe with which the driver assistance system plans the trajectory of the vehicle. The trajectories of the one or more road users may be predicted for a few seconds (short-term prediction timeframe) or longer (mid-term prediction timeframe to long-term prediction timeframe).

The predictions of the trajectories may comprise a sequence of coordinates, e.g., XY-coordinates in a local coordinate system associated with the vehicle or coordinates in a global coordinate system such as WGS-84. It would also be possible that the predictions of the trajectories comprise derivatives of position coordinates, i.e., velocity and/or acceleration. The predictions of the trajectory may include orientations/headings of the respective road users, e.g., for each coordinate that defines their location. Information on such predictions of the trajectories of one or more road users can be provided to the driver assistance system of the vehicle. The driver assistance system of the vehicle can then take measures in order to avoid collisions or accidents. The driver assistance system can plan the trajectory of the vehicle based on the trajectories of the one or more road users in the surrounding of the vehicle.

According to various examples, the predictions of the trajectories of the one or more road users are based on a behavioral model. The behavioral model accordingly outputs the predictions of the trajectories of the one or more road users. The behavioral model predicts a behavior of road users. The behavioral model may take into account subjective decision-making of the road users. The behavioral model, accordingly, determines a human intention. This can be labeled "human intent prediction".

As a general rule, a behavioral model used throughout the disclosure may model behavior of road users in non-critical traffic situations. For instance, traffic flow in a cruising situation on a highway or freeway may be modeled. This typically occurs on a mid-term to long-term prediction timeframe. This may take into account following behavior in which a given road user follows and other road user, e.g., introducing latency and acceleration and deceleration. Such behavioral models oftentimes do not take into account limitations in the perception of road users, i.e., the inability to perceive the surrounding without error. Typically, such behavioral models of non-critical traffic situations provide the prediction of the trajectory of a given road user for a prediction timeframe having a length of seconds or even tens of seconds. Another class of behavioral models used throughout the disclosure models behavior of road users in critical traffic situations. The prediction timeframe of a behavioral model modeling the behavior of road users in critical traffic situations may have a length of less than one or 2 seconds or even a sub-second length. For such short-term prediction timeframes, perception errors or blind spots in the perception of a given road user become particularly important. This is because such perception errors or blind spots in the perception of a given road user cannot be overcome by extended observation durations. A given road user is forced to act on a short timeframe without the possibility of observing the surrounding any further.

As a general rule, a non-emergency behavioral model and/or an emergency behavioral model may be used. The predictions of the trajectories may be provided for short-term to long-term prediction timeframes.

A behavioral model as used herein may include multiple modules. For instance, there may be a perceive module modeling the perception of the human. Blind spots or lack of attention may limit the humans ability to perceive the surrounding. The behavioral model may also include a cognition module, modeling inference of the human based on the perceived surrounding. The cognition module may model the decision-making process of the human, introducing latency. Further, a certain random component in the decision-making is possible. Depending on the amount of time available to process perceived information of the surrounding, reflexes vs. informed decision may have higher or lower importance. The behavioral model may also include an act module. The act module obtains input from the cognition module and determines the action taken by the user based on the preceding processing of information. The act module may model the inability of a user to put into action certain decisions, e.g., due to physical limitations or inabilities, etc.

In the behavioral model, one or more internal states of a road user can be considered for making the prediction of the trajectory of that user.

Examples of such internal states include neuronal and cognitive steps of signal processing in humans. In detail, the behavioral model can comprise several modules, e.g., for perception, cognition, and action (perceive-think-act). The dynamic emotional states can be formed and/or taken into account in one or more of these modules of the behavioral model. This means, for example, that perception and/or processing/cognition and/or action can be influenced by the dynamic emotional states (emotion parameters). Examples of such emotion parameters include aggression; anger; confusion; nervousness; anxiety; sadness; joy; fatigue; exhaustion; and stress. If one or more of these dynamic emotional states are used, they can each be assigned a value or level.

According to various examples, the one or more internal states also include physiological and/or psychological characteristics (PP parameters). The PP parameters can, for example, describe certain boundary conditions or restrictions for road user-specific signal processing, such as limited field of vision, reaction and processing times, typical errors in distance or speed estimation, limited working memory, etc. The PP parameters can be selected from, for example: Age, physical condition, intoxication, driving experience, rule adversity, general driving style, comfort, distractibility.

Various techniques are based on the finding that such internal states differ from road user to road user. For instance, a first road user may have a particular high aggression level, while a second road user may not have a particularly high aggression level, but may have a particularly high fatigue level. Similarly, the third road user may have a particularly high intoxication level, while another, fourth road user may have a particularly slow driving style, but no intoxication.

According to various examples, multiple instances of the behavioral model are instantiated, one for each road user. It is then possible to parameterize each instance of the behavioral model. I.e., one or more values or levels of internal states—such as emotional states and/or PP characteristics—are set for each road user. This may enable to accurately capture the distribution of personalities observed for the road users in the surrounding.

Various techniques are based on the finding that such internal states of a road user described by the behavioral model are, per se, hidden states. While the internal states of a road user cannot be measured directly, they can be estimated based on sensor data. Various techniques are disclosed that enable parameterizing an instance of the behavioral model based on sensor data. I.e., techniques are disclosed that enable revealing one or more internal states of a road user in the surrounding based on sensor data.

Various techniques are based on the finding that to be able to interface with the driver assistance system at acceptable latency levels, the parametrizing of the behavioral model as well as its inference (i.e., to determine the prediction of the trajectory as the output of the behavioral model) is required to be fast. For instance, if the driver assistance system is required to trigger an evasive maneuver or trigger emergency braking, the latency restrictions imposed by the driver assistance system would be typically in the sub-second regime or even in the millisecond regime. If the latency required interface with the driver assistance system exceeds such a latency restriction, the driver assistance system cannot effectively avoid the hazardous situation. To meet such latency requirements also for emergency situations (emergency behavioral model and emergency driver assistance system), techniques are disclosed that enable edge-processing of sensor data at the vehicle to parametrize and subsequently infer multiple instances of a behavioral model for each of multiple road users at low latency. In particular, techniques are disclosed that enable such parameterization to require relatively few computational resources due to a limited complexity of the behavioral model. The number of parameters included in the behavioral model may be limited to less than E6 or optionally less than E5 or further optionally less than E4. The number of free parameters for which the values are set when parametrizing the respective instance of the behavioral model may be even smaller, e.g., less than 50 or optionally less than 30.

Various techniques disclosed herein rely on an approach which, firstly, creates multiple copies of the behavioral model, each copy then being associated with unique parameter values for a number of free parameters. Then, secondly, each copy (also referred to as instance) of the behavioral model thus parametrized can be used to make a respective prediction of the trajectory of that road user. This is different to an all-integrated approach according to reference implementations, in which a single behavioral model is fed with sensor data or preprocessed sensor data without adjusting for any internal free parameters. I.e., the same behavioral model is inferred for all road users. Such reference implementations tend to provide less accurate results for the predictions of the trajectories of the road users and/or require significant model complexity. I.e., the number of model parameters needs to be larger or even extremely large (e.g., more than E6 or even E7 parameters) to be able to capture all different types of road users having various internal states and/or to be able to capture different prediction time frames, from short prediction time frames in view of emergency situations to long prediction time frames for flow scenarios. Oftentimes, large neural networks are used that are trained off-line based on training datasets, e.g., obtained through measurement campaigns and/or from simulation. The complexity of such all-purpose/foundational behavioral models limits their application to edge-computing scenarios (i.e., in-vehicle inference), specifically if they require low latency.

FIG. 1 schematically illustrates a vehicle 120. The vehicle 120 includes multiple sensors 141, 142.

The sensors 141, 142 are configured to observe a surrounding of the vehicle 120 and provide sensor data. The sensor data subject to the downstream processing as disclosed herein can be preprocessed to a smaller or larger extent.

Example sensors include radar sensors, LIDAR sensors, ultrasonic sensors, stereo camera sensors, monovision camera sensors, to give just a few examples. Next, details with respect to sensor data are discussed. Radar: Raw Data: Echo time of flight, frequency shift, and signal strength, indicating distance, relative velocity, and object size approximation. Processed Data: Object positioning (distance and angle) and velocity (speed and direction). Lidar: Raw Data: Laser pulse time of flight, directly measuring object distance. Processed Data: 3D point clouds representing the environment, used for object identification. Ultrasonic Sensors: Raw Data: Sound wave echo time of flight, measuring proximity to nearby objects. Processed Data: Distance measurements to objects. Mono- or Stereocamera Sensors: Paired or sets of images from cameras at different angles. Processed Data: Depth information through image comparison.

The vehicle 120 also includes a processing device 151. The processing device 151 can include one or more processors and one or more memories. The one or more processors can load program code from the one or more memories and execute the program code. The one or more processors, upon executing the program code, are configured to perform techniques as disclosed herein, e.g.: obtaining sensor data; processing the sensor data, e.g., to detect and/or track road users and/or to parametrize instances of a behavioral model; interfering multiple instances of a behavioral model; interface with a driver assistance system; implement a driver assistance system; etc.

Variations of FIG. 1 are conceivable. There may be more than one processing device. Different processing devices may execute different functionalities, modules, or system. For instance, a first processing device may execute human intent prediction as disclosed herein using a behavioral modal, a second processing device may execute a driver assistance system, a third processing device may process sensor data, e.g., performing a sensor fusion, etc. Other variations of FIG. 1 are possible. For instance, there may be further and/or different sensors as those illustrated in FIG. 1.

Figure 2:
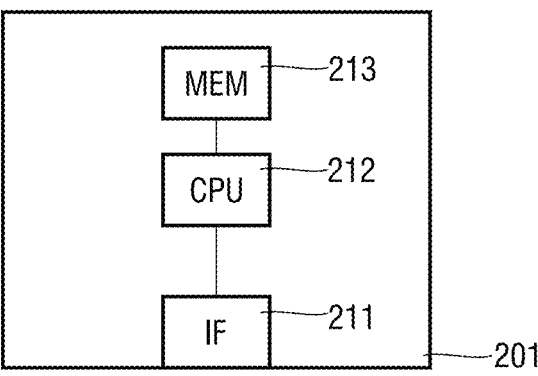
FIG. 2 is a schematic illustration of a processing device according to various examples.

FIG. 2 schematically illustrates a processing device 201. For instance, the processing device 201 may implement the processing device 151 as illustrated in FIG. 1. The processing device 201 includes a processor 212 and a memory 213, e.g., a non-volatile memory. The processing device 201 also includes a communication interface 211. The processor 212 may communicate with one or more further nodes such as processing devices, sensors, etc. via the communication interface 211. For instance, the processor 212 may obtain sensor data from one or more sensors via the communication interface 211. Alternatively or additionally the processor 212 can interface with a further processing device that implements a driver assistance system via the communication interface 211. For instance, the processor 212 can provide information that is based on predicted trajectories of multiple road users as obtained from inferences of multiple instances of a behavioral model via the communication interface 211.

Figure 3:
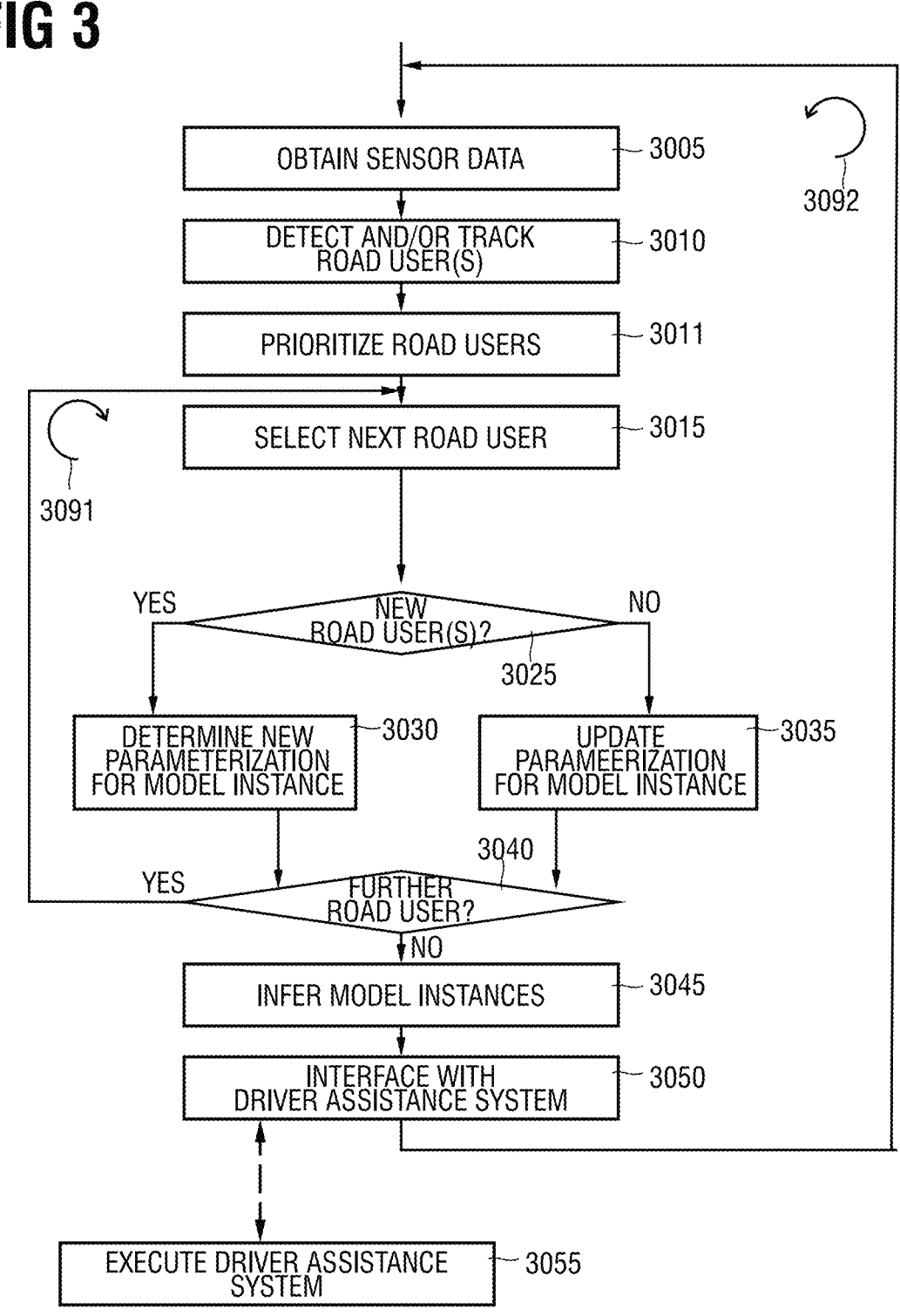
FIG. 3 is a flowchart of a method according to various examples.

FIG. 3 is a flowchart of a method according to various examples. For instance, the method of FIG. 3 may be executed by one or more processors of one or more processing devices upon loading program code from a memory and upon executing the program code. For instance, the method of FIG. 3 may be executed by the processor 212 of the processing device 201, upon loading program code from the memory 213.

At box 3005, sensor data that is indicative of one or more road users is obtained. For instance, raw sensor data or preprocessed sensor data can be obtained. Aspects pertaining to possible implementations of the sensor data have been previously discussed in connection with FIG. 1.

Box 3005 is associated with multiple iterations 3092. I.e., sensor data is obtained for multiple iterations of box 3005. For instance, a time sequence of sensor data may be obtained.

Next, at box 3010, it is optionally possible to detect and/or track one or more road users based on the sensor data.

Box 3010 is optional. For example, tracking may not be required in all scenarios. Also, sometimes it is possible that the sensor data is preprocessed so that it already provides a list of road users. It is also possible that the list of road users assigned unique identities to each road user, thereby tracking road users across time. In other scenarios, box 3010 can include a sensor fusion of sensor data obtained from multiple sensors. Then, based on the result of the sensor fusion, it would be possible to detect individual road users. Tracking algorithms can be employed in order to track individual road users across time.

As a general rule, tracking road users may be accomplished based on the sensor data. For instance, it would be possible to locate multiple road users in a preceding iteration 3092; and in a subsequent iteration 3092 it is then possible to again locate multiple road users and based on a comparison of the respective locations in the two iterations 3092, a match can be performed. Alternatives to such location-based tracking are conceivable. For instance, pattern-based tracking is another option.

For instance, an output of box 3010 can pertain to a list of road users, can be assigned with the same identity, thereby tracking these road users across time.

At box 3011, it is optionally possible to prioritize different road users if multiple road users are present. Prioritization can generally pertain to arranging a sequence according to which further processing steps associated with each road user are executed. Further processing of data associated with a higher priority road user can be executed before or using more compute resources if compared to a further processing of data associated with a lower priority road user.

As a general rule, multiple decision criteria are conceivable for prioritizing road users. For instance, road users that are closer to the vehicle can be assigned a higher priority. Alternatively or additionally, road users that are more vulnerable than other road users can be assigned a higher priority. For example, pedestrians or children may be assigned with a higher priority if compared to vehicles.

It would be possible to determine a criticality level associated with each road user. Such criticality level can specify how endangered the particular road users and/or how dangerous the particular road user is for the vehicle. Such criticality level may be determined based on an ego-trajectory of the vehicle, e.g., if compared to the trajectory of that road user. Alternatively or additionally such criticality level can be determined based on a distance of the respective road user with respect to the vehicle. Then, it is possible to prioritize based on the criticality level. In particular, subsequent steps such as determining a parameterization for instances of the behavioral model and/or the inference can be prioritized based on such criticality levels. Such techniques ensure that the human intent prediction becomes available at low latency at least for those road users for which it is required the most—also for in-vehicle processing with limited compute resources.

At box 3015, the next road user to be processed is selected. Box 3015 defines one or more iterations 3091. The number of iterations 3091 corresponds to the number of road users that are processed. The selection at box 3015 may take into account a prioritization as previously executed at box 3011.

At box 3025, it is determined whether the currently selected road user—as selected in the current iteration 3091 of box 3015—is a road user that is newly detected in the surrounding of the vehicle (e.g., a road user that has not been processed in the preceding iteration 3092) or is rather a road user that has been previously detected. For instance, this can be based on a tracking of road users, as previously explained in connection with box 3010. A comparison of locations of road users may be used in box 3025.

If a road user has not been previously seen, an instance of the behavioral model is not available for that road user. In the case of a newly-appearing road user, box 3030 is executed. In box 3030, a respective instance of the behavioral model associated with that road user that is currently being processed (i.e., selected at the current iteration 3091 of box 3015) is parametrized. This means that for that instance of the behavioral model one or more values of one or more free parameters of the behavioral model are set. This parameterization—i.e., a set of values for free parameters—is based on the sensor data.

As a general rule, a typical parameterization may include not more than 20 free parameters of the behavioral model. For instance, number of PP parameters and/or a number of emotional parameters as previously discussed above can be included in a parameterization.

For instance, box 3030 may include determining a type of the road user. Box 3030 may include a respective classification. For instance, there may be multiple candidate types available such as vehicle, pedestrian, vulnerable person, child, to give just a few examples. Within each type of road user, a certain set of values for free parameters may then be allowable. This is based on the finding that, e.g., vehicles will act differently than pedestrians.

If, on the other hand, a road user has been previously seen, box 3035 is optionally executed. At box 3035, the parameterization of the respective instance of the behavioral model associated with that road user can be updated. For instance, one or more values of free parameters of that instance may be adjusted, i.e., changed starting from their previous value of the previously valid parameterization.

There are various options available for implementing such update of the values of the free parameters.

In one example, an iterative fitting process can be executed. To give an example, a certain road user may be classified—at box 3030, i.e., when the road user is newly observed—as a child. Subsequently, values of the free parameters such as awareness, agility, etc. are fitted to redefined expectations based on the observed trajectory of the child, when executing multiple iterations 3091 of box 3035. In a further example, another road user may be classified as sports vehicle, upon first executing box 3030 when the road user is newly observed. Then, for subsequent iteration 3091 of box 3035, the trajectory of this road user and, in particular, acceleration and distances to other road users, are used for fitting values of the free parameters aggressiveness, decisiveness, and rule adversity.

Such fitting processes as explained above can rely on predefined patterns and the observations for that road user may be compared—as part of the fitting process—with these predefined patterns. Depending on the level of matching between the observations (e.g., the trajectories, distances to other road users, gaze direction, etc.) with the predefined patterns, the values of the free parameters can be set in order to provide explanations for the observations that are consistent with the predefined patterns. Such fitting processes are iterative, because it may be repeated multiple iterations 3091. Since typically from iteration 3091 to iteration 3091 additional observations become available, the fitting process tends to increase in accuracy.

For instance, it would be possible to use an iterative recursive filter at box 3035. For instance, a Kalman filter may be used. A Kalman filter may be used to estimate the values of one or more free parameters (as hidden observables) of the behavioral model based on sequence of input data that is sequentially becoming available in multiple iterations 3092. Kalman filtering, also known as linear quadratic estimation, generally uses a series of measurements observed over time (here the sensor data that become available one after another in the multiple iterations 3092 of box 3005), including statistical noise and other inaccuracies, and produces estimates of unknown variables (here: the parameterization of the behavioral model, e.g., specifies levels of PP parameters and/or levels of emotion parameters and/or levels of other internal states of the behavioral model). Such filtered estimates tend to be more accurate than those based on a single measurement alone, by estimating a joint probability distribution over the variables for each timeframe.

Next, at box 3040, it is determined whether a further road user needs to be processed, i.e., whether a further iteration 3091 is required. If this is not the case, the method commences at box 3045. At box 3045, the instances of the behavioral model are inferred. I.e., for each of the one or more road users, a respective prediction of the respective trajectory for that road user is determined using the respective instance of the behavioral model.

Then, at box 3050, interfacing with a driver assistance system of the vehicle based on the predictions of the trajectories as obtained from box 3045 is executed. For instance, it would be possible to provide an indication of the predictions of the trajectories for each road user to the driver assistance system. Each trajectory may be associated with a respective identity or indicator of the respective road user.

At box 3055, the driver assistance system is executed.

Various forms of driver assistance systems may operate based on the predictions of the trajectories. For instance, the driver assistance system may steer the vehicle, i.e., define the trajectory of the vehicle including its velocity. In some scenarios, the driver assistance system may be assisted in the sense that it does not steer the vehicle autonomously, but provides guidance to the user. This may include issuing a warning etc.

Execution of the driver assistance system can be in parallel with the remaining process associated with the iterations 3091, 3092. The driver assistance system can be provided with up-to-date information on the human intent for multiple road users, whenever box 3050 is executed.

Next, various options will be disclosed pertaining to box 3030 and box 3035. I.e., various options will be disclosed how to determine and/or update a parameterization of a given instance of the behavioral model based on sensor data.

In a first example, the sensor data may include trajectories for each of the one or more road users. In other words, the sensor data may specify a change of location for each of the one or more road users. It would then be possible that the parameterizations of the instances of the behavioral model depend on the trajectories. For instance, based on trajectories of a vehicle, it would be possible to determine whether the respective road user tends to maintain a larger or smaller distance to the leading vehicle, the affinity of a given road user for lane changes and, from this, derive a level of aggressiveness. Similarly, it can be determined whether a speed limit is exceeded and derive a level of rule adversity. These are only two specific examples, and many further variations are conceivable.

In a second example, it would be possible that the parameterizations of the instances of the behavioral model depend on reactions of each of the one or more road users to one or more external triggers captured by the sensor data. Thus, in other words, it would be possible that the sensor data captures the interaction of one or more objects in the surrounding of the vehicle with the given road user and then monitors the reaction of that road user to such interaction. This corresponds to probing the awareness of the respective road user as well as probing whether that road user reacts in an aggressive, passive, defensive, etc. manner to such trigger. Example triggers would be lane cutting by another road user, sudden change of the speed limit, slow driver ahead, driver ahead accelerating suddenly, driver ahead decelerating suddenly, etc.

In a third example, the sensor data may include one or more camera images. Camera images may be obtained from cameras of the vehicle monitoring a surrounding of the vehicle. For instance, camera images may be obtained from front-facing cameras, rear-facing cameras and/or side-facing cameras. The parameterization of each instance of the behavioral model may then depend on one or more features extracted from the one or more camera images for the respective road user. Various such features may be extracted from the one or more camera images. A few examples are provided below. For instance, it would be possible to extract a gaze direction and/or facial expression of a given road user from a camera image. A gaze direction may define whether the user directs his/her visual field towards the ego-position. A facial expression may represent whether the particular road user is angry, happy, distracted, etc. Thus, the facial expression is suited to determine a value for emotion parameters such as aggression, anger, confusion, nervousness, anxiety, sadness, joy, fatigue, exhaustion, or stress. Similarly, it may be possible to determine one or more values for one or more PP parameters such as age. Alternatively or additionally to a facial expression, other types of features extracted from one or more camera images can be taken into account for determining or adjusting the parameterization of each instance of the behavioral model. Some examples of such types of features are provided below. For example, a vehicle type of the vehicle of a road user may be considered when determining or adjusting the parameterization. To give an example, a sports vehicle or a delivery vehicle may be lead to a different parameterization if compared to a family van vehicle or a rental car vehicle. The age and/or condition of the vehicle may be taken into account. Similarly, a police vehicle or an ambulance may lead to a different parameterization if compared to a non-official vehicle. It would be possible that the parameterization depends on whether an official vehicle operates with an activated warning light. Such a vehicle type may not only be relevant for cars or passenger cars as explained above, but also for bicycles. For instance, a racing bicycle may lead to different parameterization as if compared to a cargo bicycle, to give just one example. It would be possible to consider the license plate of the vehicle. In particular, it would be possible to determine whether the license plate is indicative of a local driver or a remote driver. This is because remote drivers may tend to drive more cautiously if compared to local drivers that are familiar with the particular area. For this, a geo-comparison can be executed between the area in which the vehicle is located and the area associated with the recognized license plate. Yet a further type of feature that is extracted from the one or more camera images can pertain to age, gender or physical disabilities of a person. Other appearances such as clothing—e.g., jogger versus stroller—may allow conclusions on the appropriate parameterization. This also applies to carry on objects such as stroller, rollator walker, walking stick, dog, etc. For instance, it would be possible to determine posture and/or height/size of a pedestrian.

Such examples disclosed above may also be combined with each other, to form further examples.

For example, such determining or updating of a parameterization based on the sensor data can include a forward calculation of one or more parameter values of the respective instance of the behavioral model. One specific example would be using a machine-learning model, e.g., a deep neural network, that is configured to predict, when inferred, the values of free parameters of the behavioral model based on the sensor data. Such machine-learning model may be trained using simulated training data, e.g., as disclosed in WO 2023/275401 A1.

Such forward calculation is to be discriminated against an iterative optimization of a parameter value with optimization of a merit function. Typically, a forward calculation—e.g., implemented as a single forward-pass of a deep neural network or a single lookup in the lookup table—is associated with a significant significantly smaller number of required computational resources if compared to an iterative optimization. Thus, the forward pass can be completed at a relatively low latency. However, scenarios are conceivable in which an iterative optimization of values of one or more free parameters is executed as part of the determining or updating of the parameterization.

As will be appreciated from the above, there can be manifold features included in the sensor data that impact the parameterization. Furthermore, many of these features can provide certain evidence regarding the values of one or more free parameters of the behavioral model; however, some of these features may be unsuited for determining or adjusting the parameterization in a deterministic manner. Accordingly, it would be possible that the parameterization is determined or adjusted in a probabilistic manner based on the sensor data. This would mean that probability distributions can be defined for values of one or more free parameters of the behavioral model.

Such probability distributions describe how probable/likely specific value of a respective free parameter is. Then, the actual value of a given free parameter may be selected in accordance with the probability distribution. It would also be possible that the inference of the respective instance of the behavioral model operates based on these probability distributions. I.e., it would be possible that the probability distributions are sampled during inference. Thereby, it would be possible that the predictions of the trajectories of the one or more road users are also provided in a probabilistic manner, e.g., as probability distributions that may be characterized by mean and standard deviation.

As a general rule, it would be possible that the probability distributions are fixedly predefined. I.e., the same probability distributions may be assumed to be valid irrespective of the context of the surrounding of the vehicle. However, in some scenarios, it would be possible that the probability distributions are not globally valid, but rather determined based on a context of the surrounding of the vehicle. For instance, based on the geo-position of the vehicle different probability distributions may be determined. For instance, it would be possible that depending on whether the vehicle is located in an urban environment or in a rural environment, different probability distributions are determined. A time of the day or weekday may be taken into account. For instance, multiple candidate probability distributions may be available in the memory and loaded depending on the context of the surrounding of the vehicle. Such context-dependent probability distributions may consider that depending on the context of the surrounding of the vehicle certain values of the free parameters are more likely or unlikely to occur. For instance, there may be a tendency for a higher level of aggressiveness for urban environments if compared to rural environments. This can be considered by shifting the mean of a respective distribution towards higher levels of aggressiveness. Beyond shifting the mean of distributions, also their width and/or shape can be adjusted, e.g., modeling diverse and heterogeneous environments by wide or multi-peak distributions.

Above, multiple factors that are specific to each road user in the surrounding of the vehicle have been disclosed as impacting the parameterization of each instance of the behavioral model. Considering such road-user-specific factors yields a road-user-specific parameterization for each instance of the behavioral model. In addition to such road-user-specific factors, it would also be possible to take into account one or more factors that do not change from road user to road user. Specifically, it would be possible to take into account a context of surrounding of the vehicle. The context is a global context, i.e., applies to the vehicle and all road users. This context may be time dependent and/or location-dependent. For instance, it would be possible to consider a weekday or daytime. For instance, there may be a tendency that fewer road users showing high levels of anger or stress are encountered on a holiday or Sunday at noon, if compared to a weekday in the morning or evening rush hour. Likewise, it would be possible to consider the particular geographical area in which the vehicle is situated. For instance, the average level of anger or stress may be lower in rural areas if compared to urban areas. Significant levels of fatigue or exhaustion or more likely to be encountered during night time if compared to daytime. These are only some qualitative examples in various modifications are conceivable. For example, it would be possible that determining and/or updating the parameterization of each instance of the behavioral model includes calculation of values of one or more free parameters as a deviation from a baseline, wherein that baseline depends on such context. Thereby, levels of certain emotional parameterizes may be biased towards higher or a smaller values depending on the context.

FIG. 3 is a flowchart illustrating various concepts of such method. Various modifications are conceivable. For instance, instead of serially executing multiple iterations 3091 of processing different road users, parallel processing would be conceivable. For instance, a processing device executing boxes in FIG. 3 may include a parallel compute platform that includes a plurality of processors. These processors are configured to execute parallel threads of data processing. A scheduler module can be configured to assign different ones of the parallel threads to the plurality of processors. In particular, threads can be instantiated for each of the one or more road users. Accordingly, different iterations 3091 can be allocated to different threads. Then, parallel processing becomes possible so that timely predictions of the trajectories become available for all road users in the surrounding.

Figure 4:
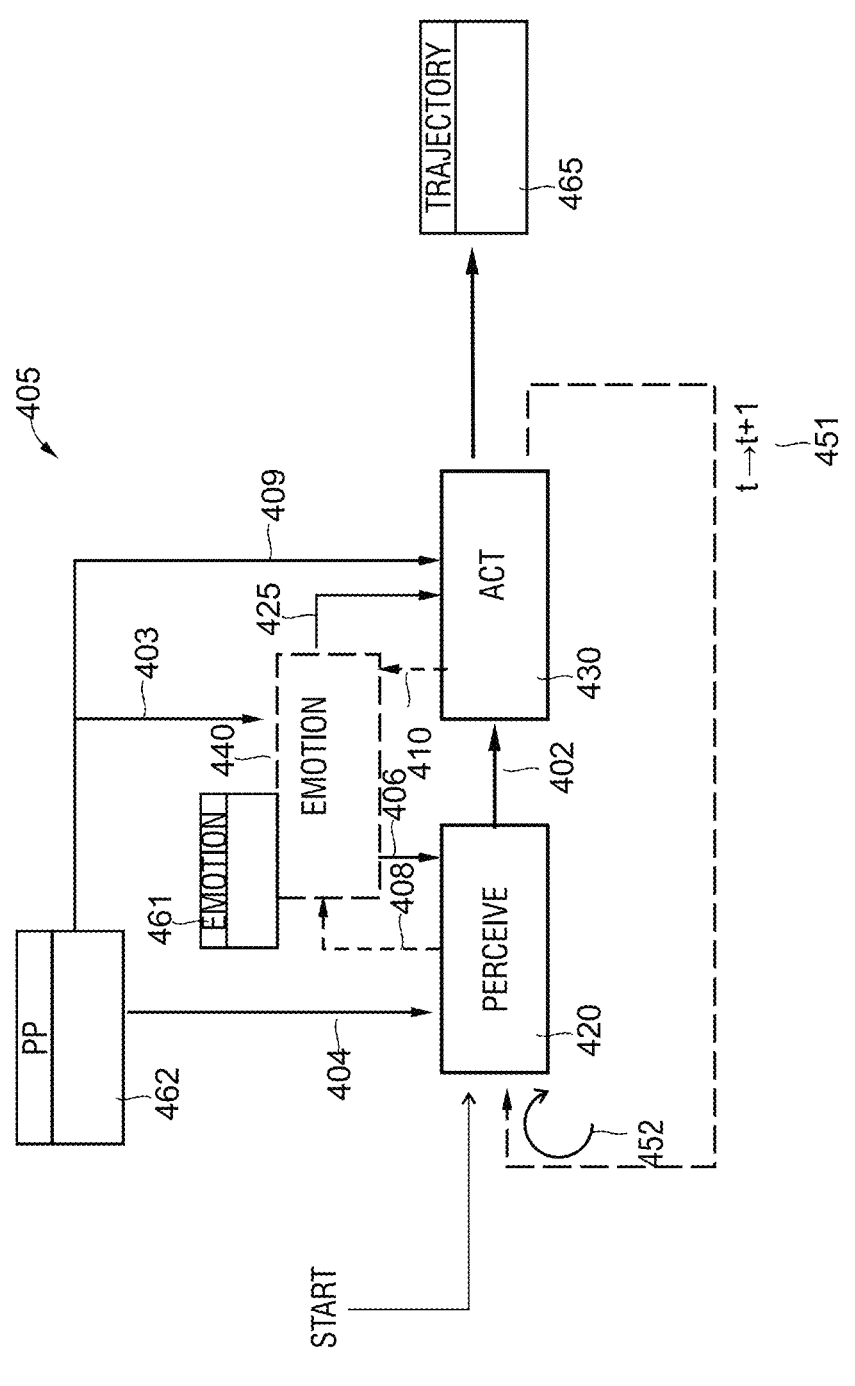
FIG. 4 schematically illustrates a behavioral model according to various examples.

FIG. 4 illustrates aspects relating to a behavioral model 405. Optional dependencies or data processing flows are marked using dashed lines in FIG. 4. The behavioral model 405 is used to determine a set of internal states for each road user. The behavioral model 405, when inferred, iteratively calculates the behavior of that road user within a prediction time frame; this enables to derive a prediction 465 of the trajectory of the road user.

The behavioral model 405 includes a module 420 for determining a subjective perception of an environmental situation of the respective road user in the simulation world.

In addition, the behavioral model 405 also includes a module 430 for determining actions of the respective road user based on his perception of the environmental situation (dependency 402).

These are only examples of modules. For example, it would be conceivable that a further module is arranged between the module 420 for perception and the module 430 for action (not shown in FIG. 4), which enables cognitive processing of perceived information from the module 420 (cognition module).

In the scenario shown, the behavioral model 405 also includes a module 440 associated with one or more emotional parameters 461.

Values of the one or more emotional parameters 461 are part of the parameterization of the respective instance of the behavioral model 405. Different road users can be characterized by different values of the one or more emotional parameters 461. As illustrated in FIG. 4, based on dependencies 406, 425, such emotional parameters 461 have an impact on the perception at module 420 and the acting at module 430.

It is optionally possible—as illustrated by the dependencies 408, 410—that the values of the one or more emotional parameters 461 are adapted throughout the prediction time-frame. For this, an incremental prediction using multiple iterations 452, each iteration 452 being associated with a respective time slot of the prediction timeframe, is employed. This may be in particular useful for mid-term to long-term prediction timeframes; for short-term prediction timeframes, a single iteration 452 may suffice. If multiple iterations 452 are used, it is possible to update, from iteration 452 to iteration 452, the values of the one or more emotional parameters 461, starting from an initial value that is defined by the parameterization.

FIG. 4 also shows that it is possible for the behavioral model 405 to take PP parameters 462 into account. The values of the PP parameters 462 are defined by the respective parameterization of that instance of the behavioral model 405. In principle, the PP parameters 462 can influence both the determination of perception in module 420, as well as module 440, and/or the determination of actions in module 430; as illustrated by the dependencies 403, 404, 409.

In further detail, the module 420 models sensory perception, i.e., describes the recording of information from the surrounding. This includes visual perception. Here, relevant limitations of human road users, for example a restricted field of vision, can be considered. The restricted field of vision may be compensated by eye movements. The simulated eye movements are controlled by a complex attention process that takes into account both top-down signals, such as the currently intended action, and bottom-up signals, such as illuminated brake lights in the peripheral field of vision. These may depend on PP parameters 462 and/or emotion parameters 461.

A cognition module—not shown in FIG. 4—uses the information recorded in the perception modules (especially visual perception) to form an internal representation of the external world. In this process, an internal representation of the environment may be formed from the visual situation, which also reflects only the objects actually recognized. Explicit modeling of this cognition module allows the behavioral model to realistically describe characteristic misjudgments, such as the frequently occurring overestimation of the distance to vehicles in the rearview mirror. In the same way that a human driver forms a prediction about the further development of a traffic situation in advance, the behavioral model draws on previously identified information about the type, position and speed of other road users, as well as the internal map of the road course, to create a context-specific prediction from this information. In complex traffic scenarios, the behavioral model may use a prediction mechanism in which the respective road user anticipates the behavior of all other road users based on its individual assessment of the traffic situation.

The prediction of the situation forms the further basis for the decision of the simulated agent/road user for a concrete driving behavior. For this purpose, the act module 430 may employ a maximization mechanism that allows the simulated agent to make a trade-off for each traffic situation between speedy progress, distance to other road users, and the resulting risk of an accident. The motor performance of individual road users is also a significant cause of individual differences between road users, which a behavioral model represents in order to be able to show characteristic differences between e.g. old and young road users, but also motor restrictions due to the influence of medication.

The individual modules presented above are implemented using various technical approaches. These are, for example, algorithms from theoretical neuroscience or from robotics and control engineering. In individual modules, classic machine learning approaches such as neural networks (e.g., LSTM, GRU) are also used. In contrast to reference implementations that learn the entire human behavior model as an end-to-end model in a single network, it is thus possible massively reduce the complexity of the machine learning problem, and thus use machine learning methods much more effectively. Such a behavioral model 405 enables fast inference, i.e., the amount of computational resources is particularly limited, e.g., if compared to end-to-end deep neural networks. Furthermore, it is flexible to handle various traffic situations across a large input space; this is also different to machine-learning algorithms that are trained using training datasets often times not sampling the entire input space at a sufficient density.

The system architecture of the behavioral model 405 reproduces the human sequence of information processing, simulation how humans perceive their environment, how they cognitively process information, come to decisions, and finally translate decisions into actions. In these modules, the behavioral model includes human characteristics and limitations (limited field of view, limited cognitive processing capacity), enabling life-like human intent prediction.

Although the disclosure has been shown and described with respect to certain preferred embodiments, equivalents and modifications will occur to others skilled in the art upon the reading and understanding of the specification. The present disclosure includes all such equivalents and modifications and is limited only by the scope of the appended claims.

The invention claimed is:

1. A processing device for a vehicle, the processing device comprising at least one processor and a memory, the at least one processor being configured to load program code from the memory and to execute the program code, the at least one processor, upon executing the program code, being configured to:

obtain, from at least one sensor of the vehicle, sensor data indicative of one or more road users in a surrounding of the vehicle, based on the sensor data and for each of one or more road users: determine a respective parameterization for a respective instance of a behavioral model,

wherein the behavioral model is a single unified behavioral model that is instantiated for each road user and comprises free parameters, wherein the parameterization comprises determining corresponding values of the free parameters, for each of the one or more road users: infer the respective instance of the behavioral model to determine a prediction of a respective trajectory of the respective road user, and based on the predictions of the trajectories of the one or more road users, interfacing with a driver assistance system of the vehicle.

2. The processing device of claim 1, wherein the at least one processor, upon executing the program code, is further configured to:

track each of the one or more road users in the surrounding of the vehicle, wherein the parameterizations of the instances of the behavioral model are updated based on said tracking of each of the one or more road users.

3. The processing device of claim 2, wherein the parameterizations of the instances of the behavioral model are updated using an iterative fitting process for adjusting values of one or more free parameters of the behavioral model.

4. The processing device of claim 1, wherein the sensor data comprises trajectories for each of the one or more road users, wherein the parameterizations of the instances of the behavioral model depend on the trajectories of each of the one or more road users.

5. The processing device of claim 1, wherein the parameterizations of the instances of the behavioral model are dependent on reactions of each of the one or more road users to one or more external triggers captured by the sensor data.

6. The processing device of claim 1, wherein the sensor data comprises one or more camera images, wherein the parameterization of each instance of the behavioral model depends on one or more features extracted from the one or more camera images for the respective road user.

7. The processing device of claim 6, wherein the one or more features are selected from a group comprising: gaze direction of a respective one of the one or more road users; facial expression of a respective one of the one or more road users; vehicle type of a vehicle of a respective one of the one or more road users; age or condition of a vehicle of a vehicle of a respective one of the one or more road users; license plate number of a vehicle of a vehicle of a respective one of the one or more road users; a carry-on object of a respective road user.

8. The processing device of claim 1, wherein the parameterization of each instance of the behavioral model comprises not more than 20 free parameters of the behavioral model, optionally not more than 10 free parameters.

9. The processing device of claim 1, wherein the parameterization of each instance of the behavioral model depends on a context of the surrounding of the vehicle.

10. The processing device of claim 9, wherein said determining the parameterization of each instance of the behavioral model comprises calculation of one or more respective parameter values as a deviation to a baseline, the baseline depending on the context.

11. The processing device of claim 1,
wherein the parameterization of each instance of the behavioral model is determined by inferring a machine-learning model operating based on the sensor data.

12. The processing device of claim 1,
wherein the parameterization of each instance of the behavioral model is determined based on at least one of a forward calculation, a look-up operation, or an iterative optimization.

13. The processing device of claim 1,
wherein the predictions of the trajectories of the one or more road users have a prediction timeframe of not more than five seconds, optionally of not more than one second,
wherein said interfacing triggers an emergency maneuver of the vehicle.

14. The processing device of claim 1,
wherein the one or more road users comprise multiple road users,
wherein the at least one processor, upon executing the program code, is further configured to:
for each of the multiple road users: determine a criticality level associated with the respective road user of the multiple road users, and
prioritize at least one of said parameterizing of the instances of the behavioral model or said inferring of the instances of the behavioral model based on the criticality levels associated with each of the multiple road users.

15. The processing device of claim 1,
wherein the processing device comprises a parallel compute platform including a plurality of processors configured to execute parallel threads of data processing,
wherein the processing device comprises a scheduler configured to assign different ones of the parallel threads to the plurality of processors,
wherein the scheduler is configured to instantiate a thread for each of the one or more road users.

16. The processing device of claim 1,
wherein the parameterization of each instance of the behavioral model is based on probability distributions of values of multiple free parameters of the behavioral model.

17. The processing device of claim 16, further comprising:
determining the probability distributions depending on a context of the surrounding of the vehicle.

18. The processing device of claim 1,
wherein the behavioral model comprises multiple modules selected from a group comprising: perceive module; cognition module; act module; emotion module.

19. The processing device of claim 1,
wherein the at least one processor, upon executing the program code, is further configured to:
execute the driver assistance system and control the vehicle based on an output of the driver assistance system.

20. A computer implemented method, comprising:
obtaining, from at least one sensor of a vehicle, sensor data indicative of one or more road users in a surrounding of the vehicle,
based on the sensor data and for each of one or more road users: determining a respective parameterization for a respective instance of a behavioral model,
wherein the behavioral model is a single unified behavioral model that is instantiated for each road user and comprises free parameters,
wherein the parameterization comprises determining corresponding values of the free parameters,
for each of the one or more road users: inferring the respective instance of the behavioral model to determine a prediction of a respective trajectory of the respective road user, and
based on the predictions of the trajectories of the one or more road users, interfacing with a driver assistance system of the vehicle.

* * * * *